United States Patent [19]

Hofmann et al.

[11] Patent Number: 4,610,441
[45] Date of Patent: Sep. 9, 1986

[54] EXPANSION SLEEVE FOR APPLYING PRECISE CIRCUMFERENTIAL STRESS

[75] Inventors: Hans Hofmann, Ruckersdorf; Heinz Ziegler, Engelthal, both of Fed. Rep. of Germany

[73] Assignee: Emuge-Werk Richard Glimpel Fabrik fur Prazisionswerkzeuge, Lauf, Fed. Rep. of Germany

[21] Appl. No.: 704,220

[22] Filed: Feb. 22, 1985

[30] Foreign Application Priority Data

Feb. 24, 1984 [DE] Fed. Rep. of Germany ....... 3406637

[51] Int. Cl.$^4$ .............................................. B23Q 3/14
[52] U.S. Cl. ................................................. 269/48.1
[58] Field of Search ........................... 269/48.1; 242/72

[56] References Cited

U.S. PATENT DOCUMENTS

| | | | |
|---|---|---|---|
| 2,615,414 | 10/1952 | Adams et al. | 269/48.1 |
| 2,667,139 | 1/1954 | Campbell | 269/48.1 |
| 3,770,287 | 11/1973 | Weber et al. | 269/48.1 |
| 4,106,783 | 8/1978 | Glimpel | 269/48.1 |

Primary Examiner—Frederick R. Schmidt
Assistant Examiner—Judy J. Hartman
Attorney, Agent, or Firm—Holman & Stern

[57] ABSTRACT

An expansive sleeve provided with at least one stress cover associated with a hollow workpiece, which stress cover is provided with basically annular thickened regions bearing respective stress surfaces. It is desired that these outer stress surfaces be essentially in the form of cylindrical casing surfaces but that there be no radial outbowing of the individual stress surface so as to form a contact locus in the form of an arc resulting from a peak. This is achieved in that the basically annular thickened regions each comprise a protruding structure equipped with a cylindrical stress surface. With this expansive sleeve, the stress surface is no longer subject to bowing and formation of a peak contact locus comprised of an arc, because the stress surface is on the protruding structure.

5 Claims, 10 Drawing Figures

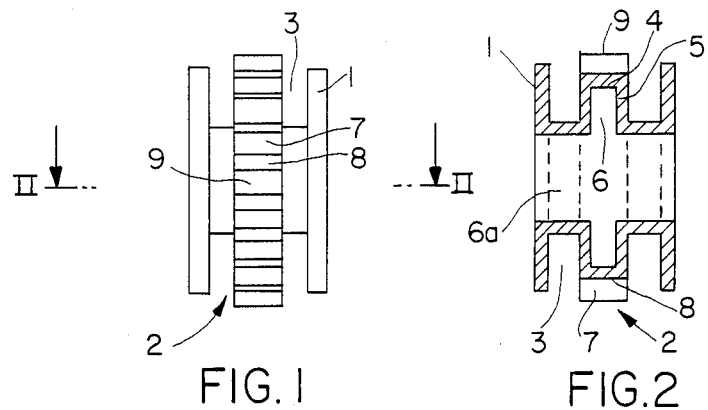
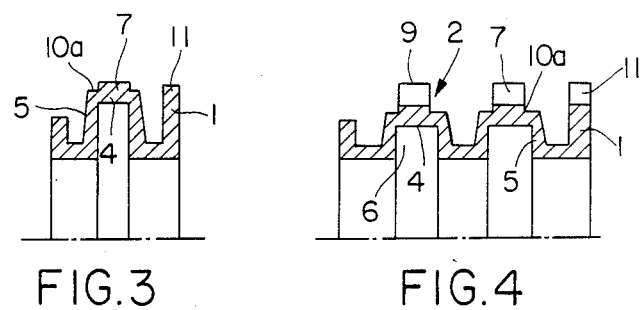
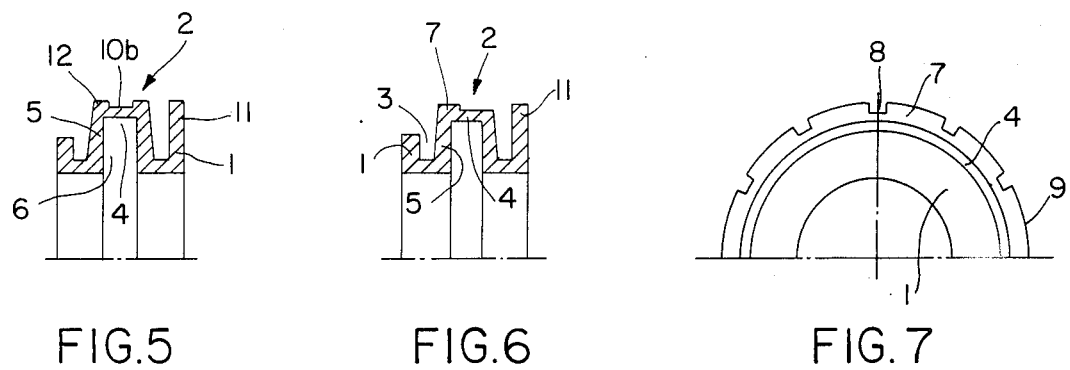

EXPANSION SLEEVE FOR APPLYING PRECISE CIRCUMFERENTIAL STRESS

BACKGROUND OF THE INVENTION

The invention relates to an expansive sleeve for applying precisely centered expansion stress to a workpiece, by means of outward radial expansion brought about by axial pressure, said sleeve comprising outwardly open grooves and inwardly open grooves, which grooves are delimited by encircling circumferential web members and cylindrical circumferential stress covers, at least one of which stress covers is associated with the workpiece. Each such workpiece-associated stress cover is provided with thickened regions which are basically cylindircal and which are provided with stress surfaces delimited by grooves, wherewith the stress cover itself forms the bottom of said grooves, and wherein the radial thickness of the thickened regions is at least one-half greater than the thickness of the stress cover.

In a known expansive sleeve of this type (Swiss Pat. No. 309,260), three encircling thickened regions are provided per stress cover (and per workpiece) each of which comprises a thread which forms a stress surface having a sharp angular tooth configuration which extends to the base of the said thread. Apart from this threaded configuration, the general shape of the known expansive sleeve is such that the stress cover itself comprises a cylindrical stress surface. The expansion of this type of expansive sleeve depends upon the fact that the stress cover bows under pressure; hence, the first cylindircal stress surface bows under pressure, whereby the locus of contact with the workpiece is only a circular arc.

There are various disadvantages associated with this limited circular contact locus of the outwardly bowed stress surface. The stress surface is in actual use primarily only along the line of contact. In the case of a short expansive sleeve with only one stress surface acting on the workpiece, it is thus possible for the workpiece to bend around the peak of the bowed stress cover upon which it sits. In the case of an expansive sleeve arrangement employing two or more such stress surfaces acting on the workpiece, the workpiece must be positioned so precisely that its two end sections are forced to rest on the respective outwaredly bowed portions of the two outer stress surfaces. In particular, the workpiece must not overextend either of these peak loci unless auxiliary end extensions are also provided therefor.

OBJECT OF THE INVENTION

Accordingly, it is an object of the invention to devise an expansive sleeve of the type described supra, wherein the stress surfaces are essentially in the form of cylindrical casings but wherein there is no appreciable radial outbowing of each individual stress surface so as to form a contact locus in the form of an arc due to a peak. This object is achieved by the invented expansive sleeve, which is characterized in that the generally annular thickened regions each comprise a protruding structure whose stress surface is in an outer cylindrical casing.

SUMMARY OF THE INVENTION

In the invented expansive sleeve, or bushing, the stress surface, which is comprised in a cylindrical surface and is generally annular in form, is no longer subject to bowing and the formation of a peak's arc-like contact locus because the stress surface is on the protruding structure which comprises a thickened region adjacent to the stress cover. The result is the avoidance of the above-mentioned disadvantages associated with the bowing phenomenon. The protruding structures do not bring about, or only negligibly produce, an outward bowing of the stress cover itself, and thus have no or only negligible effect on the elastic properties of the overall expansive sleeve, since the grooves confer sufficient elastic expansibility to each stress cover. The item to which radially outward stress is to be applied by the invented sleeve may be a workpiece, a tool or another hollow object for which precise centering is important.

The grooves delimiting the protruding structures run, only in the circumferential direction. It is particularly advantageous if the following are provided in alternating fashion around the circumference of the sleeve: protruding segments with cylindrical casing stress surfaces, and transverse, axial grooves which may run at an angle to the central axis of the sleeve. With this configuration, the width of a groove (at the base) is always equal to or less than the axial width of the casing surface of the protruding structure. Thereby, the elastic movements of the expansive sleeve are optimally employed. As a rule, more than three transverse grooves are provided.

With axially running grooves, it is conceivable that the protruding structures may extend over the entire width of the stress surface. It is particularly advantageous if only one or two protruding structures are provided along the axial length of the expansive sleeve. These ring-like structures, which may be subdivided along the circumference by axial, transverse grooves, yield, to a sufficient degree, a cylindrical stress surface.

It is also possible for three or more protruding structures to be provided circumferentially on a single stress cover, each of which structures is set off by a corresponding radial groove. It is particularly advantageous if two such protruding structures are provided on opposite axial sides of each stress cover, with one radial groove separating the two cylindrical stress surfaces. With this configuration, the ratio of the annular surface occupied by the radial groove to the annular surface occupied by the two cylindrical stress surfaces is particularly favorable. This configuration is used in particular with an expansive sleeve for expanding or supporting an axially short workpiece, because there will always be enough stressing surface provided by the two ring-shaped protruding structures spaced a correspondingly short distance apart.

It is also particularly advantageouswe if, in the case of an expansive sleeve arrangement comprising two workpiece-expanding (or workpiece-stressing) cylindrical stress surfaces, each stress cover (of the two) acting on the workpiece comprises only two oppositely disposed protruding structures. This arrangement is best employed in an expansion (stressing) of a short workpiece by means of only two stress covers.

The cross-sectional shape of the invented expansive sleeve, or bushing, is as a rule similar to a square wave, where each element of the sleeve structure is set off by an outwardly open groove and an inwardly open groove, with a transverse radial web member (connecting leg) therebetween.

The stress surfaces which carry the protruding structures may be perfectly annular or may be arranged radially in helical segments. These stress surfaces structure, as a rule, are in the form of a narrow annulus. The radial grooves, as a rule, do not have a pitch like a thread but are in a plane normal to the center axis of the expansive sleeve.

One of the chief advantages of the invented expansive sleeve is the progress it represents from the prior art situation of the stress-surface contact locus being in a thin arc to a situation where the contact locus is a much wider surface region with a controlled stress absorption for relatively short workpieces having diameter-to-length ratios of less than 1:2. The experimentally verifiable degree of reduction of eccentricity is on the order of 1:3.

A hollow, generally cylindrical, body subjected to expansive stress by the invented expansive sleeve cooperates with the outer stress surfaces of the expansive sleeve.

Preferred embodiments of the invention are illustrated in the drawings.

BRIEF DESCRIPTION OF THE DRAWINGS

FIG. 1 is a view of an expansive sleeve for applying precisely centered expansion stress;

FIG. 2 is a cross section through line II—II of FIG. 1;

FIG. 3 is a cross-sectional side view of a part of a second embodiment for an expansive sleeve;

FIG. 4 is a cross-sectional side view of part of a third embodiment for an expansive sleeve;

FIG. 5 is a cross-sectional side view of part of a fourth embodiment for an expansive sleeve;

FIG. 6 is a cross-sectional side view of part of a fifth embodiment for an expansive sleeve;

FIG. 7 is a front view of the upper half of the expansive sleeve of FIGS. 5 or 6;

DETAILED DESCRIPTION OF THE DRAWINGS

Figure 8:
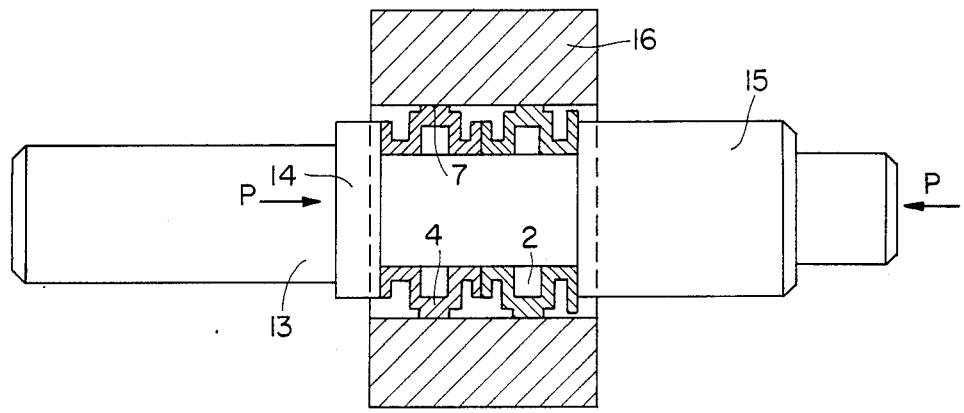
FIG. 8 is a view of an expansive-sleeve installation in a workpiece together with an axial compressor.

The expansive sleeve of FIGS. 1 and 2 has on each axial side an outer flange 1 with a complete expansion element 2 in between, where said expansion element is separated from the respective flanges by respective grooves 3 which are outwardly open. The expansion element 2 is comprised of a stress cover 4 and encircling web members 5 which delimit an inwardly open groove 6. The expansive sleeve has a central bore 6a running the entire length of its middle axis, the diameter of which bore is constant but alternatively may vary somewhat.

The outer side of the stress cover 4 which faces the workpiece to be expanded (not shown in FIGS. 1 to 7) has protruding segments 7 distributed over it which are integral with the stress cover 4 and extend over the entire axial width thereof. All the protruding segments 7 have the same radial height and the same circumferential dimension, and are separated from each other by axial grooves 8 which are mutually identical and the bottoms of which define the (radial) upper sides of the stress cover 4. Thus, an annulus of protruding segments 7 is formed, which segments are divided by axial grooves 8 which are uniformly distributed around said ring. Externally, these protruding segments 7 form the workpiece-stressing surface 9 which lies in a cylindrical surface.

In the embodiment according to FIG. 3, the protruding structure 7 on the stress cover 4 is bounded by two outwardly disposed ring-shaped grooves 10a each of which extends along the entire circumference. These grooves 10a are disposed in extensions of the radial dimensions of the web members 5, and have approximately the same axial width as their respective supporting web members 5. Also, one of the flanges 1 has a protruding structure 11 on its circumference.

The embodiment according to FIG. 4 differs from those according to FIGS. 1 to 3 in that two expansion elements 2 are present in axial sequence after the fashion of a square wave. Additional such expansion elements 2 may be present as well, but the preferred number does not exceed two expansion elements.

In the embodiment according to FIG. 5, the single expansion element 2 on the stress cover 4 is provided with two additional protruding structures 12 which are each also ring-shaped and extend along the entire circumference, and which together delimit the circumferential ring-shaped grooves 10b. The axial width of each of the protruding structures 12 is greater than the axial thickness of its corresponding web structure 5, and the axial width of the ring groove 10b is less than the axial width of the inner groove. The circumferential protruding structures 12 may also be subdivided by axial grooves (not shown) as for 8 in FIG. 7. Also in the embodiment according to FIG. 5, one of the flanges 1 has a protruding structure 11 which also may either extend continuously along the circumference of the sleeve or may be subdivided by axial grooves per FIG. 7 (not shown).

In the embodiment according to FIG. 6, the stress cover 4 is provided with a protruding structure 7, the axial width of which is less than half the axial width of the stress cover 4; it is shifted completely over to one side of the stress cover 4.

In FIG. 7, the protruding segments 7 form a ringed series with axial grooves, or divisions, 8 having rectangular cross sections whose circumferential widths are less than half the similar dimension of the protruding segments 7. The axial width of the protruding structures 7 is greater than that of their corresponding web structures 5 (not shown) as in FIGS. 5 and 6. In addition, one of the flanges 1 is provided with a ring-shaped series of protruding segments 11 also as per FIGS. 5 and 6.

FIG. 8 shows an expansion tool device wherein an arrangement of two expansive elements is provided, each with one expansion element 2 and an outwardly directed stress cover 4 for exerting stress on the workpiece 16. The axial pressure used to expand the expansive sleeve is applied as indicated by the arrows by the axial-sleeve exertion member 15 toward the fixed detent flange 14, as is known in the prior art. This arrangement is disposed on a foundation 13, between a fixed detent flange 14 and an axial-stress-exertion member 15. For present purposes, this arrangement may be regarded as equivalent to a single expansion sleeve having two expansion elements 2. The combination of the two expansive sleeves serves to apply stress to a workpiece 16, to hold it in place on the foundation member 13. Each expansion element 2 is of course provided with a ring-shaped series of protruding segments 7 medially disposed on stress covers 4, said segments 7 are also separated by axial grooves 8 in FIG. 7.

Figure 9:
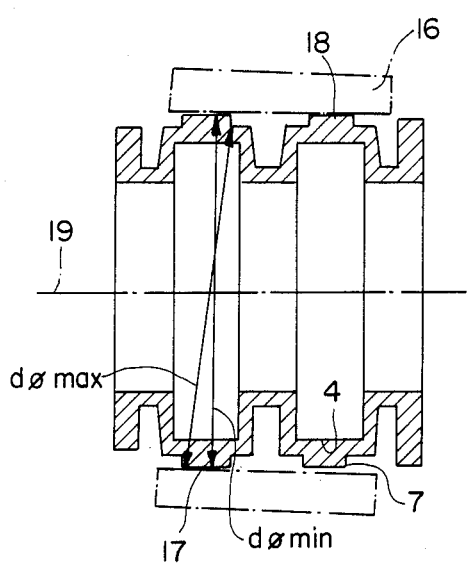
FIG. 9 is a cross-sectional side view of a sixth embodiment for an expansive sleeve and its orientation relative to a workpiece during the expansion operation.
Figure 10:
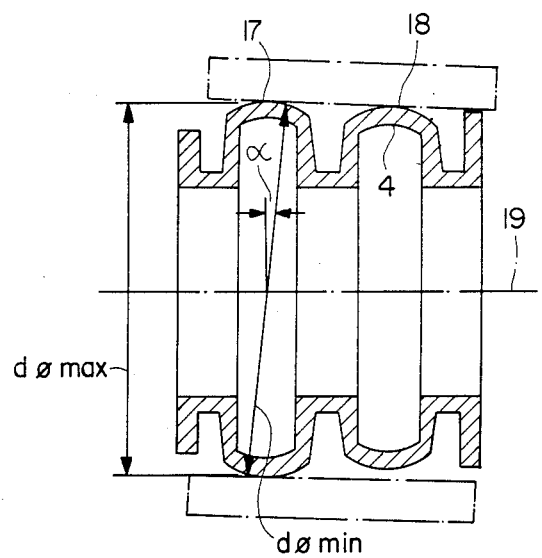
FIG. 10 is a cross-sectional side view of a known expansive sleeve and its orientation relative to a workpiece during the expansion operation (for comparison to the representation in FIG. 9).

FIGS. 9 and 10 illustrate the advantageous mode of operation of the invented expansive sleeve configuration described herein. With prior art expansive sleeves, as well as with the expansive sleeves employing protruding structures, the first stress locus 17 must lead the second stress locus 18 in the expansion of the diameter of the workpiece 16. Since most machine-tool shafts are horizontal, the consequence of this is that during the expansion operation the workpiece can be held at an angle $\alpha$. With the prior art embodiment wherein the stress cover itself widens into a barrel shape or other arcuate shape, the stress exerted on the workpiece 16 at the first stress locus 17 is not at the correct angle with respect to the center axis 19. Rather, along two radial lines it is shifted by the angle $\alpha$. When the stress cover 4 then exerts stress at the second stress locus 18, the workpiece 16 must be moved through an angle $d\phi$ against the stress cover 4 at the first stress locus 17 over a maximum diameter segment. In the case of very short workpieces 16 and stress cover 4 which are also very short, axially, this is not possible. However, with the embodiment employing protruding structures 7, the workpiece is made to describe an incline from a maximum diameter to a minimum diameter by the inclined configuration itself. Accordingly, the force on the two stress loci 17 and 18 is sufficient to hold said workpiece 16 with minimal angular shift.

Accordingly, we claim:

1. An expansive sleeve for applying precisely centered expansion stress to a hollow workpiece by means of radial expansion brought about by axial pressure, said sleeve comprising outwardly open grooves and inwardly open grooves said outwardly open grooves being delimited by annular web members and annular stress covers, wherein at least one of said stress covers transmits force to the workpiece, and wherein each such stress cover is provided with thickened regions which are generally annular in form and which contain stress surfaces that are limited by grooves whereby each stress cover itself forms a bottom of said grooves, and wherein a radial thickness of the thickened region is at least one-half greater than a thickness of the stress cover, wherein a curving of the stress cover occurs across its width and wherein the thickened regions of the stress cover each comprise a stress surface in the form of a cylindrical casing, and wherein the grooves formed by the stress cover are relatively wide, wherein a curving of the stress cover surfaces across their respective widths relative to the curving of the stress cover is substantially avoided during an expansion operation.

2. The expansive sleeve according to claim 1 wherein in alternating fashion along a circumference of said sleeve, there are arranged both thickened segments with cylindrical stress surfaces and axial grooves.

3. The expansive sleeve according to claim 1 wherein at least one thickened structure and associated stress covers is disposed along an axial length of the expansive sleeve.

4. The expansive sleeve according to claim 3; wherein two thickened structures and stress covers are provided on opposite axial sides of said sleeve with one ring-shaped groove radially extending therebetween.

5. The expansive sleeve according to claim 3 containing an expansive sleeve arrangement comprising two workpiece-stressing stress covers, each such stress cover is provided with only one annular thickened structure.

* * * * *